United States Patent [19]
Kitajima

[11] 3,707,889
[45] Jan. 2, 1973

[54] POWER CONTROL APPARATUS

[75] Inventor: Susumu Kitajima, Higashi-Osaka, Japan

[73] Assignee: Kurita Machinery Manufacturing Company Limited, Osaka, Japan

[22] Filed: March 18, 1971

[21] Appl. No.: 125,638

[30] Foreign Application Priority Data

March 27, 1970 Japan ..................... 45/26084
March 27, 1970 Japan ..................... 45/26086
April 4, 1970 Japan ..................... 45/29153

[52] U.S. Cl. .................. 74/845, 74/848, 192/150
[51] Int. Cl. ........................................... F16h 5/66
[58] Field of Search ........ 74/777, 845, 848; 192/141, 192/143, 150

[56] References Cited

UNITED STATES PATENTS

2,597,140  5/1952  Versnel ..................... 192/150
1,237,024  8/1917  Davison ..................... 192/141
2,560,238  7/1951  Nouzak ..................... 192/143
2,695,781  11/1954  Wark ..................... 192/150
2,860,871  11/1958  Schneider ..................... 192/150
3,321,992  5/1967  Kawada ..................... 74/845

Primary Examiner—C. J. Husar
Attorney—Mason, Fenwick & Lawrence

[57] ABSTRACT

A control element comprising a suitable gear mechanism and adapted to perform a power transmitting function under a given overload or braking force is provided as a constituent element of the power transmitting system between an input shaft and an output shaft. When the output shaft is subjected to a load exceeding the braking force, the control element so functions as to permit a relative rotation between the input shaft and the output shaft against the braking force. This operation of the control element further actuates a control switch for drive means and automatically controls the drive means. Due to the automatic control thus effected, the drive means is brought to a halt and the direction of rotation of the same is switched from the normal to the reverse and vice versa.

10 Claims, 14 Drawing Figures

Inventor
SUSUMU KITAJIMA
By
Mason, Fenwick & Lawrence
Attorneys

Inventor
SUSUMU KITAJIMA
By Mason, Fenwick & Lawrence
Attorneys

Inventor
SUSUMU KITAJIMA

POWER CONTROL APPARATUS

BACKGROUND OF THE INVENTION

When the output element of a power transmitting system is subjected to an overload, constituent parts of drive means and the power transmitting system are further subjected to objectionable pressure and damage or breakage will therefore result. As means for eliminating such objection, a structure has heretofore been used generally wherein a frictional transmitting element is incorporated in the power transmitting system. However, a structure of this type has an inherent drawback that even if the output element is disengaged from the input element idle rotation of the drive means will give rise to seizure or a marked wear of the frictional transmitting element, making it impossible to ensure power transmitting function over a long period. Furthermore, any means already known, when subjected to an overload on the output element, cannot sufficiently absorb or mitigate the resulting shock or impact.

It is also noted that conventional means incorporating the above-mentioned frictional transmitting element fails to properly perform both transmitting and non-transmitting functions and consequently involves various problems. Thus, it is put to only limited uses.

SUMMARY OF THE INVENTION

The present invention relates to a power control apparatus.

An object of this invention is to provide an apparatus whereby when a power transmitting system is overloaded on the output element, such overload is absorbed by shock-absorbing action and at the same time the drive means is stopped so as to eliminate objections such as idle operation of the drive means and possible damage or breakage of the drive means and power transmitting system, the apparatus further being capable of readily reversing the direction of rotation of the drive means in response to the overload exerted on the power transmitting system.

Another object of this invention is to provide an apparatus of the type described to be used for effecting reciprocal travel of filter plate transport means. In the case where filter plates are transported by reciprocal means, there is a need to bring each filter plate up to the movable end plate or the preceding filter plate into fitting contact therewith. Accordingly, the transport means which has carried a filter plate up to the terminal position has to exert sufficient pressure on the plate so as to press it against the end plate or the preceding plate before the traveling direction of the transport means is reversed for the subsequent transport operation. Such effect can be achieved satisfactorily by the shock-absorbing elastic pressure provided by the present invention.

The present invention is characterized by a control element provided as an element of a power transmitting system between an input shaft and an output shaft and comprising a suitable gear mechanism adapted to perform a power transmitting function under a given braking force, the control element being adapted to function so as to permit a relative rotation between the input shaft and the output shaft against the braking force when the output shaft is subjected to a load exceeding the braking force, such function of the control element further actuating a control switch for the drive means to effect automatic control of the drive means.

Accordingly, when the output shaft is overloaded, the overload is absorbed by the braking force acting on the control element to be operated in response thereto and, at the same time, the relative rotation produced between the input shaft and output shaft is also absorbed by the control element which functions against the braking force. For instance, even when a tool is caught in part of the power transmitting system and a high abrupt load is consequently applied to the output shaft, with the shock exerted on the drive means and transmitting system or with relative rotation produced between transmitting elements by the excess load, the drive means and transmitting system will be free from damage. The function of the control element further ensures reliable action to halt the drive means.

Since the control element comprises a gear mechanism instead of a frictional transmitting element, seizure or wear is least likely to take place and the power transmitting function during usual operation and non-transmitting function in an emergency are both ensured over a long period of use.

In accordance with this invention, the direction of rotation of the drive means can be reversed by the operation of a control switch. Since the direction of operation, i.e., rotational direction of the control element, when it is in operation to permit the above-mentioned relative rotation, changes depending upon the direction of rotation of the drive means, the operation of the switch can be effected in two ways in accordance with the direction of rotation of the drive means, with the resultant advantage that in response to the load exerted on the output shaft, such direction of the drive means can be switched from the normal to the reverse or vice versa successively and repeatedly. Thus, the present invention finds a wide variety of applications. For instance, it is useful as an apparatus for reciprocating the filter plate transport means in a filter press as will be described below.

DESCRIPTION OF THE PREFERRED EMBODIMENTS

FIGS. 1 to 5 show the most preferable embodiment of this invention. A drive wheel 1 (FIG. 3) has a worm gear 3 meshing with an input worm 2 at its outer periphery and a bevel gear 4 at one end face. A control wheel 5 serving as a control element is provided with a bevel gear 6 on its outer periphery. The drive wheel 1 and control wheel 5, with the bevel gears 4 and 6 in facing relation, are mounted on an output shaft 7 for rotation independently thereof. A pair of planetary pinions 8, which are mounted on short shafts 9 that intersect and are fixedly connected to the output shaft 7 in an integral manner, are adapted for rotation; independently thereof, and are also in meshing engagement with both bevel gears 4 and 6. Braking means 10 comprises a worm 12 meshing with a worm gear 11 formed on the outer periphery of the control wheel 5 and a braking element exerting a braking action on the worm 12 in the directions X and Y along its axis. The braking element employs a coil spring 13 which is housed within a sleeve 15 formed in part of a casing 14 for the control apparatus, the coil spring 13 being held in compressed state between a fixed stepped portion 18 and a holding screw 19 driven into the outer opening of the sleeve 15, with spring washers 16 and 17 interposed at both ends of the spring. The degree of the compression can be adjusted by the holding screw 19. A worm shaft 20 of the worm 12 extends through the coil spring 13 and the holding screw 19 and the inner peripheries of the washers 16 and 17 are in engagement with stepped portions 23 and 24 provided by collars 21 and 22 mounted on the shaft 20. Thus, the coil spring 13 exerts its resilient force on the worm shaft 20 in both directions of X and Y through the spring washers 16, 17 and the stepped portions 23 and 24, so that the worm 12 is usually retained in a given position under this action, with the result that the control wheel 5, with its worm gear 11 meshing with the worm 12, is retained in position. The braking element employing the coil spring may be built in a desired construction. Alternatively, a pneumatic or hydraulic ram may substitute for the coil spring. A similar action can likewise be achieved by braking means of a structure wherein a compression spring or a pneumatic or hydraulic ram is adapted to press against the control wheel 5 on its side face. Indicated at 46 is an input shaft carrying the input worm 2.

Figure 1:
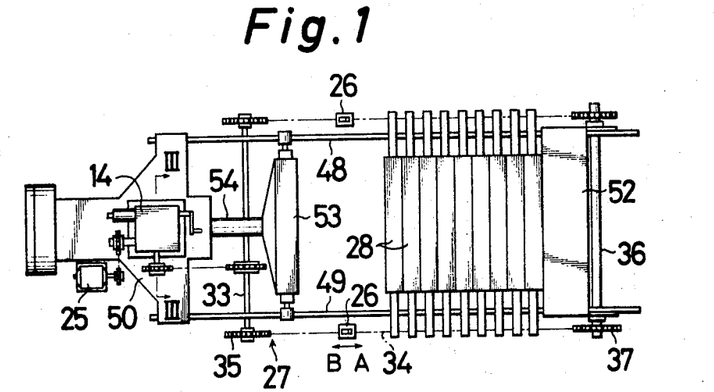
FIG. 1 is a plan view provided with the most preferable embodiment of the power control apparatus of the present invention.

As will be described below, the present embodiment further includes limit switch means of a suitable construction for reversing the rotation of a reversible motor 25, the arrangement being such that the output shaft 7 is connected to drive means 27 for filter plate transport assemblies 26 on a filter press to bring the transport assemblies 26 into reciprocation with proper timing and thereby transport filter plates 28 one after another in satisfactory condition.

Figure 4:
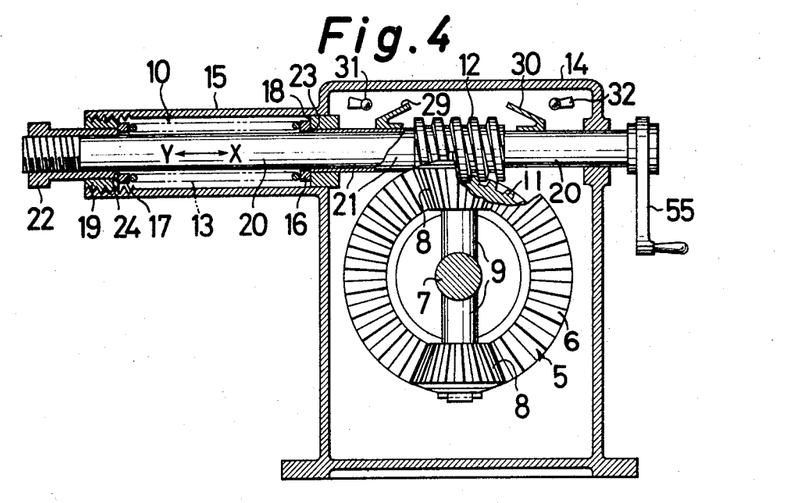
FIG. 4 is a cross-sectional view taken along the line IV — IV of FIG. 3.

More specifically, indicated at 29 and 30 are contact members mounted on the worm shaft 20 and at 31 and 32, contacts of limit switches. These members, shown in the drawing, are disposed within the casing 14. Upon being brought into contact with the contact 31, the contact member 29 serves to stop the reversible motor 25 when it is rotating in a normal direction, and the contact member 30, upon contact with the contact 32, acts to stop the reversible motor 25 when it is rotating in a reverse direction. The arrangement further includes an unillustrated timer or the like which acts to cause the motor 25 to automatically rotate in the reverse direction a predetermined time after it is stopped from rotation in the normal direction and which is adapted to cause the motor to be automatically initiated into normal rotation a predetermined time after it is stopped during reverse rotation. The drive means 27 comprises a drive shaft 33 coupled to the output shaft 7 and drive members 34 to be driven by the drive shaft 33. The drive member 34 comprises a chain reeved around a sprocket 35 mounted on the drive shaft 33 and another sprocket 37 on a rotatable shaft 36 in opposing relation to the sprocket 35 as shown in FIG. 1. Alternatively, the drive member may be a screw rod adapted to be rotated by the drive shaft 33, insofar as the filter plate transport assembly 26 can be moved reciprocally by the change of the rotation direction of the drive shaft 33.

For such reciprocal movement, each of the filter plate transport assemblies 26 is fixedly mounted on the drive member 34 intermediately thereof if it is a chain or is mounted on the drive member 34 in screw-thread engagement therewith if it is a screw rod.

Figure 5:
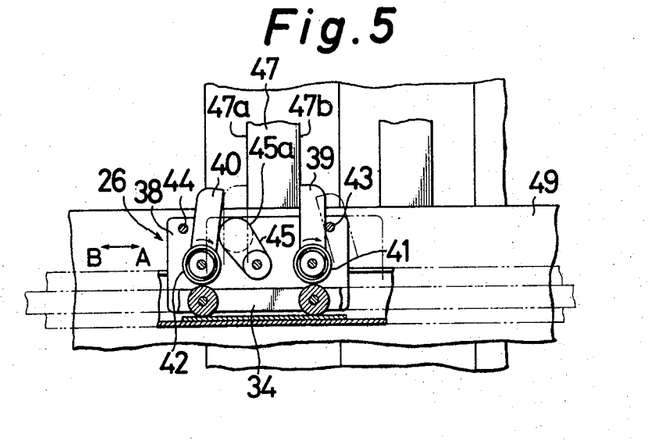
FIG. 5 is an enlarged side elevation of part of the filter press shown in FIG. 1 in which a filter plate transport assembly is shown in cross section as it is in the position ready for transport of a filter plate.

As shown in FIG. 5, each of the filter plate transport assemblies 26 comprises a frame 38 secured to the drive member 34 and a drive dog 39 and a stop dog 40 which are pivotally mounted on the frame 38 in facing relation to each other, both drive dog 39 and stop dog 40 being urged in a clockwise direction by springs 41 and 42 respectively. When brought to an upright position, the drive dog 39 is prevented from inclination toward a clockwise direction by a stopper 43, while the stop dog 40 is prevented by a stopper 44 from inclination toward a counterclockwise direction from an upright position. An idle member disposed between the drive dog 39 and the stop dog 40 is pivotally mounted on the frame 38, the free end 45a thereof being in facing relation to the opposing inner faces of the dogs 39 and 40. Accordingly, the drive dog 39 is usually retained in the upright position under the action of the spring 41, and the stop dog 40 is kept inclined under the action of the spring 42. The free end 45a of the idle member 45 is positioned between the upright drive dog 39 and the inclined stop dog 40.

The filter press includes a plurality of movable filter plates 28 each of which is provided, on its opposite sides, with handles 47 which are movably supported on a pair of side bars 48 and 49. Front and rear frames 50 and 51 support the side bars 48 and 49. Indicated at 52 is a stationary end plate and at 53, a movable end plate to be moved forward and backward by a piston 54. The movable end plate 53 and the stationary end plate 52 are positioned to the front and rear of a group of the filter plates.

For filtering operation, the piston 54 advances the movable end plate 53 toward a direction A to press the respective filter plates 28 against the stationary end plate 52. A prefilt is then supplied between adjacent filter plates 28 which are thus retained in pressing contact with each other and is subjected to filtration by a filter medium provided between each adjacent plates 28. The resulting filtrate is passed through the filter plates 28 and take out, while the cake separated from liquid remains between the plates 28.

Figure 2:
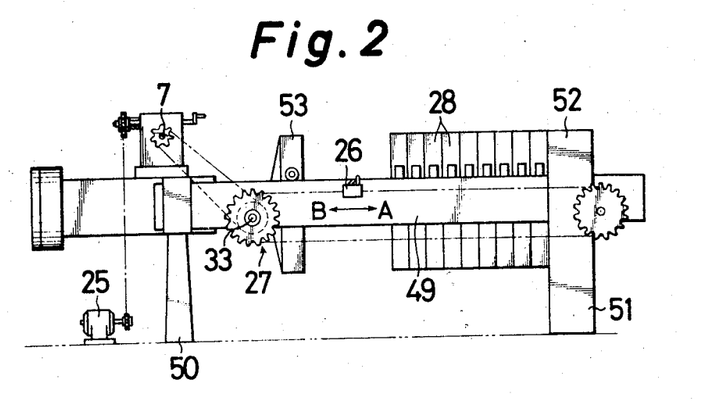
FIG. 2 is a side elevation of FIG. 1.

After filtration, the movable end plate 53 is retracted by the piston 54 as seen in FIGS. 1 and 2. The filter plates 28 are then transported one after another toward the movable end plate 53 which has been returned to the original position. When a filter plate 28 is separated from the group of the remaining plates 28 held together, the cake deposited between the adjacent plates 28 is removed. When all the plates 28 have completely been transported toward the movable end plate 53, one operation of filtration is terminated. This procedure will then be repeatedly carried out for continuous filtration.

In the foregoing operation, the filter plates 28 are transported one after another toward one side by the reciprocal travel of the filter plate transport assemblies 26. Upon completion of filtration, the reversible motor 25 is brought into rotation in a normal direction by suitable means, whereupon the filter plate transport assemblies 26 are driven in the direction of an arrow A for the transport of the foremost plate 28 in the group of the plates 28 held together.

Sequential steps of transport operation will be described. When the movable end plate 53, upon completion of filtration, is brought back to the original position as shown in FIGS. 1 and 2, the reversible motor 25 is initiated into rotation in a normal direction, whereby the input worm 2 is rotated to drive the drive wheel 1 by way of the worm gear 3 which is in meshing engagement with the worm 2. The torque delivered to the drive wheel 1 is therefore transmitted, through the bevel gear 4, to the planetary pinions 8 meshing therewith. Since the transport assemblies 26 are in free condition at this time, the output shaft 7 is unloaded. Accordingly, the planetary pinions 8 which are supplied with the torque of the drive wheel 1 through the bevel gear 4 move orbitally on the control wheel 5 in meshing engagement with the bevel gear 6 thereon, without driving the control wheel 5 on which a braking force is acting, but thereby driving, through shafts 9, the output shaft 7 in a normal direction which shaft 7 is under a small load.

The output shaft 7, when thus driven in a normal direction, further drives the drive shaft 33 connected thereto in a normal direction, with the result that the drive members 34 are moved in the direction of the arrow A. Due to this movement, the filter plate transport assemblies 26 are also moved in the same direction, namely, in the direction of the arrow A which is opposite to that of plate transport, to approach the foremost plate of the group of the filter plates 28 for transport. As seen in FIGS. 1 and 2, each of the transport assemblies 26 at this time is in free state without interference with any other members, and the drive dog 39 and the stop dog 40 thereon are in upright and inclined positions respectively. As the transport assembly 26 is moved further in the direction of the arrow A, the front end of the drive dog 39 is brought into contact with the front face 47a of the handle 47 of the foremost plate 28, whereupon the drive dog 39 is impeded from further movement. Consequently, by virtue of the subsequent movement in the direction A of the transport assembly 26, the drive dog 39 passes under the handle 47 while being inclined in the transport direction, namely, in the direction of an arrow B against the action of the spring 41. The inclination of the drive dog 39 now forces the free end 45a of the idle member 45 to move in the direction B, thereby bringing the inclined stop dog 40 to an upright position against the action of the spring 42 acting thereon.

When the drive dog 39 has been passed under the handle 47 and freed from engagement therewith, the drive dog 39 is brought back to the upright position under the action of the spring 41 to relieve the free end 45a from pressure exerted thereon. Although the stop dog 40 tends to incline again under the action of the spring 42, it is prevented from such inclination due to the fact that the front end of the dog 40 comes into contact with the front face 47a of the handle 47. Subsequent movement of the transport assembly 26 in the direction A further raises the stop dog 40 in contact with the handle 47 until it is brought to the position indicated in an imaginary line in FIG. 5 where the stopper 44 blocks the pivotal movement. Thus the stop dog 40 no longer permits the transport assembly 26 to move forward in the direction A.

Figure 3:
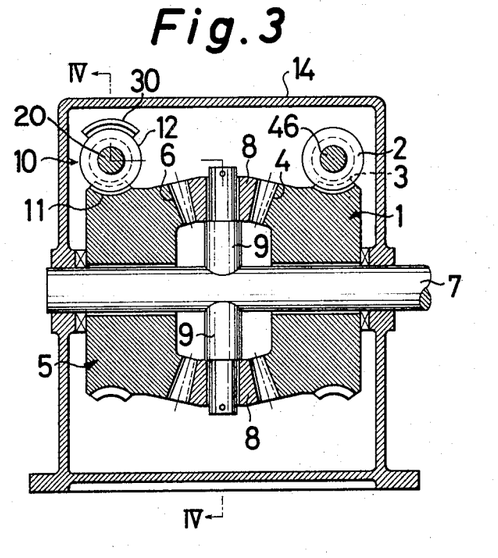
FIG. 3 is an enlarged cross-sectional view taken along the line III — III in FIG. 1.

The prevention of further movement of the transport assembly 26 now applies an overload to the output shaft 7 through the drive means 27. Since this load is greater than the braking force acting on the control wheel 5, the planetary pinions 8 supplied with the torque of the drive wheel 1 now drive the control wheel 5 which is under a relatively smaller load. Accordingly, the planetary pinions are no longer moved orbitally but are driven in a fixed position to drive the control wheel 5 through the bevel gear 6 against the braking force acting thereon. The rotation of the control wheel 5 causes the worm gear 11 thereon to move the worm 12 in the direction of Y axially thereof in meshing engagement with the worm 12. Thus, the overload exerted on the output shaft 7 produces the movement of the worm 12 in the direction Y. On the other hand, the coil spring 13, acting on the worm shaft 20 for the worm 12 and serving as a braking element against the rotation of the control wheel 5, produces a shock-absorbing action on the movement of the worm 12 in the direction Y, abrupt movement thereby being prevented.

Put another way, when the output shaft 7 is subjected to an overload, there arises a relative rotation between the output shaft 7 and the drive wheel 1 which tends to rotate in a constant state. However, such relative rotation is absorbed by the rotation of the control wheel 5 which is driven against the braking force acting thereon and is therefore subjected to the shock-absorbing action produced by the braking force. As a result, notwithstanding that the output shaft 7 is halted under an overload acting thereon, every part of the power transmission system is protected from shock or impact by the shock-absorbing action produced by the braking element, insofar as the above-mentioned relative rotation is absorbed by the rotation of the control wheel 5. Further the movement of the worm 12 and the worm shaft 20 in the direction Y (FIG. 4) effected by the rotation of the control wheel 5 brings the contact member 29 on the worm shaft 20 into contact with the contact 31 of one limit switch so as to actuate the switch, while the control wheel 5 is being driven against the braking force.

The limit switch thus actuated stops the reversible motor 25, which is initiated, after lapse of a predetermined period of time, into reverse rotation by a timer or the like. At this time, the control wheel 5 and braking means 10 are returned to the original state.

In this way, each of the filter plate transport assemblies 26 is moved in the direction A after completion of filtration, and when the drive dog 39 is brought to the rear of the handle 47 of the foremost plate 28 with the stop dog 40 abutting against the front face 47a of the handle 47, the reversible motor 25 is halted and then initiated into reverse rotation. The drive dog 39 now positioned behind the handle 47 after passing thereunder is retained in upright state by the spring 41.

The reversible motor, when rotated in the opposite direction, drives the drive member 34 in a direction B in which the filter plates 28 are to be transported. The transport assembly 26 is therefore moved in the same direction and causes the drive dog 39 to abut against the rear face 47b of the handle 47 as indicated in a solid line in FIG. 5. The drive dog 39, being prevented from inclination in the direction A by the stopper 43, transports the foremost plate 28 in engagement with its handle 47 during subsequent movement of the transport assembly 26 in the direction B. The movement of the plate 28 will be prevented, when it is moved in this direction and brought up to the movable end plate 53 which has been in the original position as seen in FIGS. 1 and 2.

Accordingly, when the plate 28 has completely been transported up to the movable end plate 53, the transport assembly 26 is prevented from further travel in the direction B, with the drive dog 39 in pressing contact with the rear face 47b of the handle 47.

Due to this, the output shaft 7 is again subjected to an overload, which gives rise to a relative rotation between the output shaft 7 and the drive wheel 1 as already described, and this relative rotation is absorbed by rotation of the control wheel 5. At this time, the control wheel 5 is driven in the direction opposite to that in the foregoing case in which the reversible motor is driven in the normal direction, and the worm 12 and the worm shaft 20 are moved in the direction X (FIG. 4). As a result, the other contacting member 30 on the worm shaft 20 is brought into contact with the contact 32 of another limit switch to actuate the contact, whereby the limit switch is operated to bring the reversible motor 25 in reverse rotation to a halt. In a predetermined period of time after the stopping, the motor is initiated into rotation now in the normal direction.

The initiation of the motor 25 in the normal direction allows the drive member 34 to run in the direction A again. It will be seen that when the drive dog 39 comes into contact with the rear face 47b of the handle 47, the stop dog 40 is released from the front face 47a of the handle 47 and is already inclined by the action of the spring 42 acting thereon. For this reason, the transport assembly 26 can be moved again in the direction A when the running direction of the drive member 34 is switched from direction B to direction A after completion of transport of the filter plate 28 up to the movable end plate 53. Although the stop dog 40 at this time is positioned in front of the handle on the plate 28 which has just been transported, it merely passes under the handle of this plate 28 free from contact therewith, without bringing it backward during the movement in the direction A.

The transport assembly 26, when moved again in the direction A, approaches the group of the plates 28 for the transport of the next plate 28. In this way the filter plates 28 are transported one after another by the foregoing steps of operation repeatedly carried out.

For the transport of the plates 28 to be thus effected one plate after another, the transport assembly 26 is moved toward the next when the reversible motor 25 is switched from reverse rotation to normal rotation every time it has transported each plate 28 toward the movable end plate 53. It is to be understood that such change of rotation direction of the motor is conducted in the foregoing manner, namely, is not effected before an overload, exceeding the braking force on the control wheel 5, is exerted on the output shaft 7. In other words, the braking force acting on the control wheel 5 assures that the plate transport assembly 26, even after completion of the transport, always causes the drive dog 39 to exert on the handle 47 a pressure approximately equal to the braking force. Consequently, the filter plate 28, upon reaching the terminal position of transport, can be pressed against the movable end plate 53 or the preceding filter plate 28 under sufficient pressure, with the result that there will be no clearance left between the plate 28 and the end plate 53 or the preceding plate 28. Therefore, each of the plate 28 can always be transported a definite and yet a maximum distance from the group of the plates which are held together, each adjacent two plates 28 thus being successively separated by the greatest and yet constant distance so as to ensure very satisfactory release of cake in uniform operation all the time.

A handle 55 for adjusting the timing of the control switch is mounted on the worm shaft 20. The braking force by the coil spring 13 can be controlled by rotating the holding screw 19.

Figure 6:
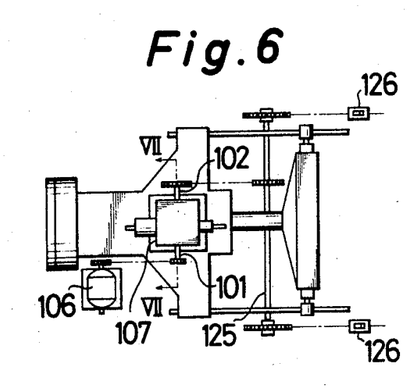
FIG. 6 is a plan view showing part of a filter press provided with another embodiment of the power control apparatus.
Figure 7:
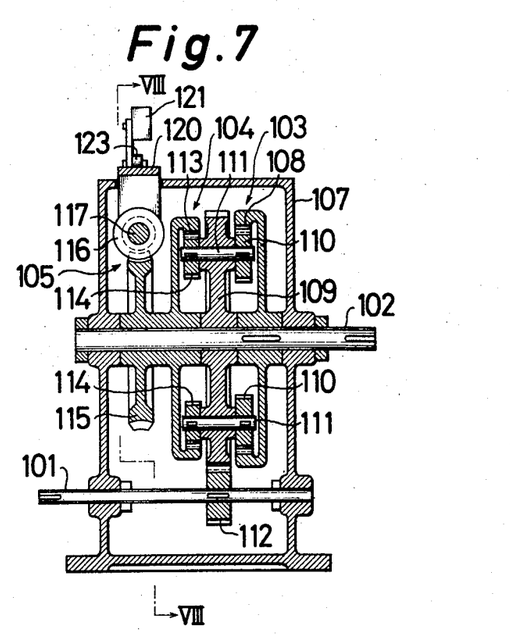
FIG. 7 is an enlarged cross-sectional view taken along the line VII — VII of FIG. 6.
Figure 8:
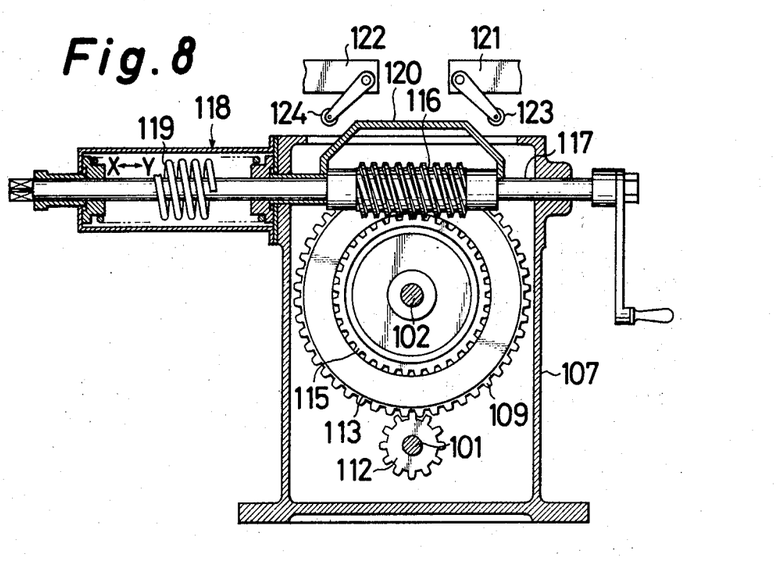
FIG. 8 is a cross-sectional view taken along the line VIII — VIII in FIG. 7.

The embodiment shown in FIGS. 6 to 8 comprises a first planetary gear means 103 for transmitting the torque of an input shaft 101 to an output shaft 102, and a second planetary gear means 104 provided in combination with the first planetary gear means 103 and serving as a control element which normally receives a braking force to allow the first means to effect its transmission function. When the output shaft 102 is braked by an overload or the like, the second planetary gear means 104 actuates braking means 105 against its braking force, whereby a limit switch for a reversible motor 106 is further actuated. The braking means 105 comprises a worm mechanism, rack mechanism or the like.

This embodiment will be described below in detail. The output shaft 102 transversely extending through a casing 107 carries an internal gear 108 for integral rotation therewith. The first planetary gear means 103 comprises the internal gear 108, a drive gear 109 rotatably mounted on the output shaft 102, and planetary pinions 110 supported on the drive gear 109 and meshing with the internal gear 108. Each of the planetary pinions 110 is mounted on a rotary shaft 111 for integral rotation therewith, which rotary shaft 111 is rotatably supported on the drive gear 109. The drive gear 109 meshes with a pinion 112 mounted on the input shaft 101 to receive the torque of the input shaft 101. A reversible motor 106 is coupled to the input shaft 101.

The second planetary gear means 104 comprises an internal gear 113 rotatably mounted on the output shaft 102 and planetary pinions 114 each mounted on the other end of the rotary shaft 111 carrying the planetary pinion 110 and meshing with the internal gear 113.

The braking means 105 comprises a worm wheel 115 integral with the internal gear 113, a worm 116 meshing with the worm wheel 115, and a braking element 118 acting on a worm shaft 117 carrying the worm 116. As in the foregoing embodiment, the braking element 118 includes a coil spring 119 which is adapted to urge the worm shaft 117 axially in directions X and Y and normally retains the worm shaft 117 in a neutral position.

A contact member 120 mounted on the worm shaft 117 is in facing relation to contacts 123 and 124 of limit switches 121 and 122. When brought into contact with the contact 123, the contact member 120 actuates the limit switch 121 to stop the reversible motor 106 from rotation in a normal direction, the motor further being adapted to be initiated into reverse rotation after lapse of a predetermined time by a timer or the like. On the other hand, the contact of the contact member 120 with the contact 124 actuates the limit switch 122 to stop the reversible motor 106 from rotation in the reverse direction and thereafter drive it in the normal direction upon lapse of a predetermined period of time.

A drive shaft 125 for filter plate transport assemblies 126 is connected to the output shaft 102.

When filtering operation has been completed on the filter press and the reversible motor 106 is driven in the normal direction, the torque of the input shaft 101 thereby driven is delivered to the drive gear 109 through the pinion 112. Thus the rotation of the reversible motor 106 drives the drive gear 109. At this time, the planetary pinions 110 and 114 supported on the drive gear 109 at its opposite sides are orbitally moved. Since each of the transport assemblies 126 at this time is in a free state exerting no overload on the output shaft 102, the load for driving the internal gear 113 under a braking force is exceedingly greater than that for driving the internal gear 108. In spite of the orbital movement of the planetary pinions 110 and 114 on the opposite sides, therefore, the internal gear 113 is retained in a stop condition, allowing the planetary pinions 114 meshing therewith to rotate on their axes. The rotation of the planetary pinions 114 brings the planetary pinions 110 on the other side into rotation which are integral with the pinions 114, causing the internal gear 108 to rotate in meshing engagement therewith during the orbital movement. The output shaft 102 is also rotated along with the internal gear 108.

When the output shaft 102 in rotation is overloaded to such an extent that the driving load for the internal gear 108 exceeds that for the internal gear 113 which is under the braking action, the over-loaded internal gear 108 will then be slowed down or brought to a halt, giving rise to a rotation relative to the input shaft 101. This relative rotation is absorbed by the rotation of the internal gear 113 which is effected against the braking force, and a braking action is exerted on the internal gear 108 as it is slowed down or stopped.

The rotation of the internal gear 113 at this time is attributable to the fact that the planetary pinions 110 meshing with the internal gear 108 are rotated on their axes during the orbital movement due to the relative rotation between the internal gear 108 and the drive gear 109. Thus, the rotation of the planetary pinions 114 effected by the rotation of the planetary pinions 110 further brings the internal gear 113 into rotation in meshing engagement therewith, against the braking force acting thereon.

When the internal gear 113 is driven in this way, the worm wheel 115 is also driven integrally therewith, whereby the worm 116 meshing therewith is moved in the direction of Y as shown in FIG. 8. The resilient force exerted by the coil spring 119 on the worm 116 at this time serves as the braking force on the rotation of the internal gear 113. The movement of the worm 116 in the direction Y then allows the contact member 120 on the worm 117 to come into contact with the contact 123 of the limit switch 121 to actuate the limit switch 121, whereupon the reversible motor 106 rotating in the normal direction is brought to a halt and, after lapse of a predetermined period of time, is automatically initiated into reverse rotation.

The rotation of the reversible motor 106 in the opposite direction frees the output shaft 102 from the overload. Through the input shaft 101 and the first planetary gear means 103, the output shaft 102 is supplied with the rotation of the motor 106 for rotation in the reverse direction.

If the output shaft 102 is overloaded after the initiation of such rotation, the internal gear 113 will then be brought into rotation against the braking action exercised by the coil spring 119 in the same manner as above. The direction of rotation at this time, however, is opposite to that in the case where the reversible motor 106 is driven in the normal direction; the worm 116 will now be moved in the direction of X as seen in FIG. 8. As a result, the contact member 120 on the worm shaft 117 comes into contact with the contact 124 of the other limit switch 122 to actuate the same, whereupon the reversible motor 106 which is rotating in the reverse direction comes to a halt and, after lapse of a predetermined period of time, the motor is driven in the normal direction by the action of a timer or the like.

It will be apparent from the description above that in this embodiment as in the first embodiment, the direction of the reversible motor 106 is switched form the normal to the reverse and vice versa automatically when the output shaft 102 is overloaded, so that when employed as an apparatus for driving the filter plate transport assemblies 126, this embodiment ensures the same effects as the first embodiment.

Since the first and second planetary gear means 103 and 104 in this embodiment are constructed as differential mechanism which produces reduction action, additional reduction means can be eliminated.

Figure 9:
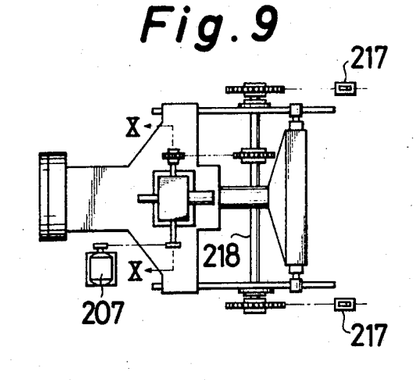
FIG. 9 is a plan view showing part of a filter press provided with another embodiment of the power control apparatus.
Figure 10:
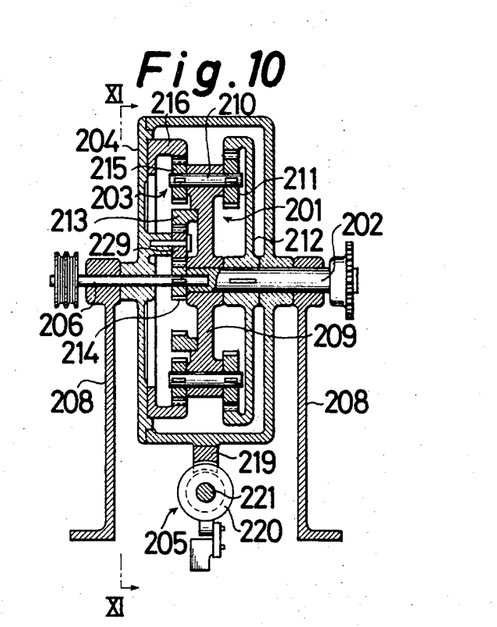
FIG. 10 is an enlarged view in cross section taken along the line X — X in FIG. 9.
Figure 11:
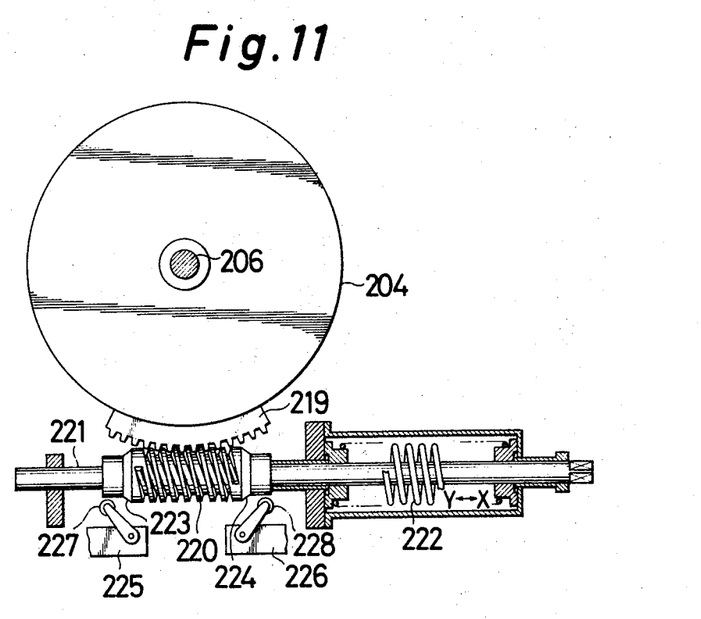
FIG. 11 is a cross-sectional view taken along the line XI — XI in FIG. 10.

The embodiment shown in FIGS. 9 to 11 has a structure wherein when an output shaft 202 having one planetary means 201 is braked due to overloading, a casing 204 integral with another planetary gear means 203 serving as a braking element is driven against the braking force of braking means 205 connected to the casing, so as to absorb a relative rotation produced between the output shaft 202 and the input shaft 206, the rotation of the casing 204, on the other hand, serving to switch the direction of rotation of a reversible motor 207 from the normal to the reverse and vice versa.

This embodiment will be described below in a greater detail. The input shaft 206 and the output shaft 202 are coaxially aligned and rotatably supported on a frame 208. The input shaft 206 is rotatably supported at its one end on one end of the output shaft 202, the shafts 206 and 202 being intermediately connected together as if to form one shaft. The input shaft 206 and the output shaft 202 thus assembled together extend through the center of the casing 204, which is therefore supported by the shafts 206 and 202 for rotation independently thereof. The first planetary gear means 201 comprises a drive wheel 209 rotatably mounted on the output shaft 202, planetary pinions 211 supported on the drive wheel 209 by rotary shafts 210, and an internal gear 212 adapted for rotation integrally with the output shaft 202, the drive wheel 209 further being provided on its one side with another internal gear 213 which is associated with a pinion 214 mounted integrally on the input shaft 206 by way of another pinion 229 which is rotatably supported on the casing 204.

The second planetary gear means 203 comprises planetary pinions 215 each mounted on the other end of the rotary shaft 210 supporting the planetary pinion 211 of the first planetary gear means 201, and an internal gear 216 meshing with the planetary pinions 215 and formed on the inner wall of the casing 204. The input shaft 206 is coupled to a reversible motor 207 and the output shaft 202, to a drive shaft 218 of filter plate transport assemblies 217.

The first and second planetary gear means 201 and 203 are all housed within the casing 204.

The braking means 205 comprises a worm 220 meshing with a sector gear 219 formed on part of the outer periphery of the casing 204 and a coil spring 222 serving as a braking element and urging a worm shaft 221 in directions X and Y axially thereof, the worm shaft 221 carrying the worm 220 thereon and having both shoulders 223 and 224 in facing relation to the contacts 227 and 228 of limit switches 225 and 226. When the worm 220 is displaced toward the direction Y with its shoulder 223 brought into contact with the contact 227 of one limit switch 225, the limit switch is actuated to halt the reversible motor 207 from rotation in the normal direction. When the worm 220 is displaced in the direction X, the shoulder 224 is brought into contact with the contact 228 of the other limit switch 226 to actuate the same, whereupon the reversible motor 207 in reverse rotation will be stopped.

Further when the motor 207 is brought to a halt from rotation in the normal or reverse direction, a timer or the like, upon lapse of a predetermined period of time, initiates the motor into rotation automatically in the direction opposite to the direction of rotation before the stoppage.

When the output shaft 202, during the rotation of the motor 207 in the normal direction, is subjected to an overload exceeding the braking force acting on the internal gear 216, the internal gear 212 is slowed down or brought to a halt, giving rise to rotation relative to the input shaft 206. Due to this relative rotation, the planetary pinions 211 meshing with the internal gear 212 are driven on their axes, allowing the planetary pinions 215 also to be rotated on their axes integrally therewith, with the result that the internal gear 216 are further driven against the braking action exerted thereon. The rotation of the internal gear 216 against the braking action absorbs the relative rotation, therefore.

The rotation of the internal gear 216 is accompanied by that of the casing 204 which is formed integrally therewith, this causing the worm shaft 221 to move toward the direction Y shown in FIG. 11 against the action of the coil spring 222, by way of the sector gear 219 attached to the periphery of the casing 204 and the worm 220 meshing with the gear 219. The displacement of the worm 220 in the direction Y now enables its shoulder 223 to come into contact with the contact 227 of the limit switch 225, so that the reversible motor 207 in rotation in the normal direction is stopped and, in a predetermined length of time the motor is initiated into rotation in the opposite direction.

With the reverse rotation of the motor 207, the worm 220 is returned to the neutral position under the action of the coil spring 222 and the casing, associated with the worm 220 by means of the sector gear 219, is also returned to the original position.

The change of the rotational direction of the motor 207 is transmitted to the output shaft 202 through the first planetary gear means 201. Accordingly, the shaft will be driven in the opposite direction simultaneously with the change of the rotational direction of the motor 207. If the output shaft 202 is overloaded during the reverse rotation, the shaft will likewise be slowed down or halted, with the result that through the second planetary gear means 203, the casing 204 will be rotated against the action of the spring 222. At this time the casing 204 is driven in the direction opposite to that in the previous case, and by way of the sector gear 219 the worm 220 will be moved in the direction X shown in FIG. 11. The worm 220 therefore allows the shoulder 224 to abut against the contact 227 of the limit switch 226 to actuate the same. The operation of the limit switch 226 then stops the motor 207 from the reverse rotation. After lapse of a predetermined length of time, it will be driven again in the normal direction.

Every time the output shaft 202 is overloaded, the direction of rotation of the reversible motor 207 will be changed from the normal to the reverse and vice versa successively.

Figure 12:
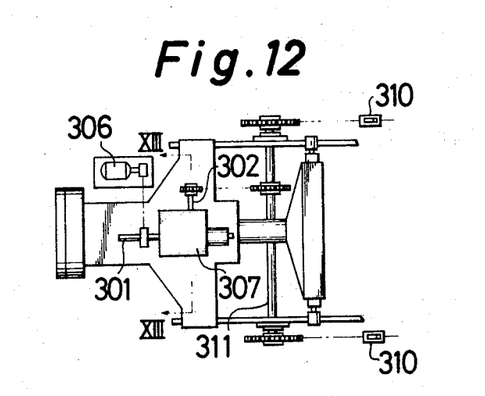
FIG. 12 is a plan view showing part of a filter press provided with another embodiment of the power control apparatus.
Figure 13:
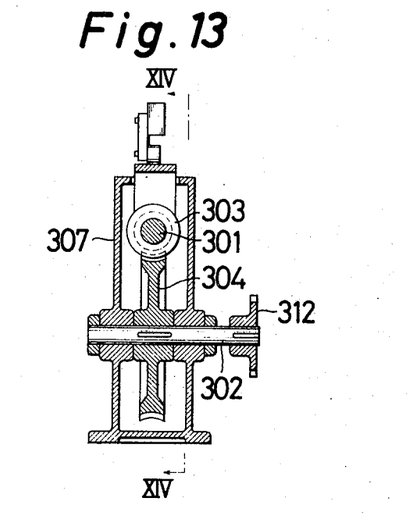
FIG. 13 is an enlarged view in cross section taken along the line XIII — XIII in FIG. 12.
Figure 14:
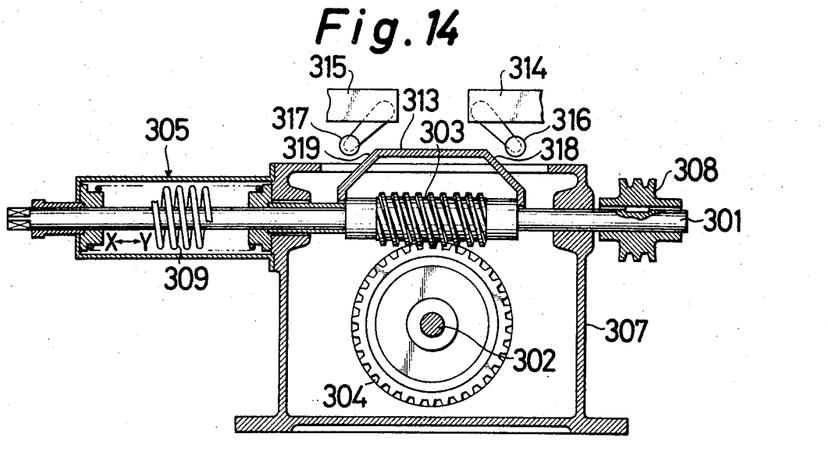
FIG. 14 is a cross-sectional view taken along the line XIV — XIV in FIG. 13.

Referring to the embodiment shown in FIGS. 12 to 14, input shaft 301 and output shaft 302 are associated with each other not by planetary gear means as in the foregoing embodiments but by worm 303 and worm wheels 304 meshing with the worm 303, the arrangement being such that when the output shaft 302 is overloaded giving rise to a possible rotation relative to the input shaft 301, the worm 303, due to its propulsive force, acts as a control element and moves in a direction of X or Y (FIG. 14) axially thereof against the braking force exerted thereon by braking means 305.

As a result, the direction of rotation of a reversible motor 306 is switched from the normal to the reverse and vice versa, the change of rotational direction thus being reversed as desired.

Described in detail, the worm 303 and the worm wheel 304 meshing with each other are both housed in a casing 307, and the input shaft 301 and the output 302 carrying the worm 303 and worm wheel 304 respectively are rotatably supported on the casing 307.

The input shaft 301 has its opposite ends extending outwardly from the casing 307, one projected end carrying a pulley 308 for associating the shaft with the reversible motor 306. Mounted at the other end extending outwardly is a coil spring 309 urging the shaft 301 in both directions X and Y axially thereof and serving as a braking element. The output shaft 302 has its one end projected outwardly from the casing 307. Mounted on this projected end is a sprocket 312 associated with a drive shaft 311 for filter plate transport assemblies 310.

A contact member 313 mounted on the input shaft 301 has both shoulders 318 and 319 respectively in facing relation to the contacts 316 and 317 of limit switches 314 and 315 which are positioned at the opposite sides of the contact member 313.

The limit switches 314 serves to stop the reversible motor 306 when it is rotating in a normal direction, while the limit switch 315 acts to stop the motor 306 from reverse rotation. When the reversible motor 306 is brought to a halt, a timer or the like acts to initiate it into rotation in the direction opposite to that before it is stopped, upon lapse of a given period of time.

During the rotation in the normal direction of the reversible motor 306, the input shaft 301 is also rotated, with the worm 303 further driving the worm wheel 304 in meshing engagement therewith. The rotation of the worm wheel 304 drives the output shaft 302. When the output shaft 302 during such rotation is subjected to an excess load which exceeds the braking force exerted on the output shaft 302, the input shaft 301 can no longer drive the worm wheel 304 by the worm 303, and the worm wheel 304 therefore tends to stop, this giving rise to a relative rotation between the input shaft 301 and the output shaft 302 carrying the worm wheel 304. The relative rotation therefore causes the worm 303 to be displaced in the direction Y in FIG. 14 under the propulsive force of screw. This displacement takes place against the action of the coil spring 309, and the relative rotation between the input shaft 301 and output shaft 302 is absorbed. Further the displacement of the input shaft 301 is subjected to the bias of the coil spring 309 which acts in the axial direction as a braking force. As a result, this braking force also acts on the above-mentioned relative rotation to be produced, assuring that no relative rotation will take place before the output shaft is subjected to a definite overload.

When the output shaft 302 is overloaded in excess of the definite level, the excess load is absorbed due to the occurrence of a relative rotation against the braking force, and the displacement of the worm 303 in the direction of Y during the relative rotation brings the shoulder 318 of the contact member 313 into contact with the contact 316 of the limit switch 314 and actuates the limit switch 314. The reversible motor 306 in rotation in normal direction is thus stopped and switched into rotation in the opposite direction upon lapse of a given period of time.

The reverse rotation thus effected allows the worm 303 to return to the original position under the influence of the coil spring 309. The output shaft 302 thereafter keeps rotating in the reverse direction in usual manner as seen in FIG. 14.

When the output shaft 302 is subjected to an overload in excess of the braking force during rotation of the reversible motor 306 in the reverse direction, a relative rotation will be produced between the input shaft 301 and the output shaft 302 against the braking force. Since the worm 303 at this time is rotating in the direction opposite to that in the above case, the worm 303, due to the relative rotation, is displaced in the direction of X as shown in FIG. 14. Accordingly, the other shoulder 319 of the contact member 313 comes into contact with the contact 317 of the limit switch 315, with the result that the limit switch 315 is actuated to halt the reversible motor 306 from rotation in the opposite direction. Upon lapse of a given period of time, the motor 306 will be initiated into rotation in normal direction.

As described above, in accordance with the present embodiment as in the foregoing embodiments, an overload in excess of a definite level, when applied on the output shaft 312, is absorbed and the reversible motor 306, once brought to a halt, is initiated into rotation in the direction opposite to that before the halting, such change in the rotational direction being effected every time the output shaft 302 is subjected to the overload. Further the worm 303 and the worm wheel 304 effect speed reducing action. Such advantages are ensured by a simple structure.

Thus, in accordance with the present invention, a relative rotation is produced between the input shaft and the output shaft against a definite braking force when the output shaft is overloaded, and the possible impacts to be exerted on the power transmitting system can be absorbed. In addition, when such relative movement is produced, the reversible motor is stopped and the direction of rotation of the motor can be reversed. In any of the foregoing embodiments, such reversion can be achieved by a worm which is moved linearly when the relative rotation is produced, or by a rack. The braking action is given by a coil spring which urges above member in both directions of its linear movement. However, the members for achieving such functions are not limited to the worm and spring, but it is of course possible to change the direction of rotation by some other rotating member and to achieve a braking action by other suitable means.

I claim:

1. Power control apparatus for a power transmitting system embodying drive means and related worm and worm gear components respectively interconnecting transversely disposed input and output shafts adapted to perform a power transmitting function attendant application of a given load or predetermined braking force thereto, said power control apparatus comprising control element means constituted in part by said worm (303) and input shaft (301) power transmitting means of said system; means mounting said control element means to permit axially shifting movements at least of said worm (303) as a control element; and braking means (305) connected with said control element means for applying the aforesaid braking force when said output shaft (302) is subjected to a load exceeding said predetermined braking force.

2. Power control apparatus as defined in claim 1, wherein said power control apparatus further includes control switch means to selectively control said drive means thereof, and control switch contact means carried by said axially shifting control element means to actuate said control switch means responsive to predetermined axial shifting movement of said control element means.

3. Power control apparatus as defined in claim 2 wherein said control switch and switch contact means cooperate to stop the drive means of said system responsive to the predetermined axial movement of said control element means.

4. Power Control apparatus as defined in claim 1, wherein said means mounting said control element means is such as to permit said axial shifting movement in opposite axial directions, and further including means for reversing the direction of rotation of said system's drive means, and said control switch and switch contact means being capable to effect a reverse drive rotation responsive to a predetermined axial movement of said control element means.

5. A power control apparatus comprising a drive wheel (1) having a bevel gear (4) on one face and another peripheral gear (3) in meshing engagement with an input shaft-mounted input gear (2), a control wheel (5) having a bevel gear (6) on one face and serving as another control element disposed in facing relation to said bevel gear (4) on said drive wheel (1), said drive wheel (1) and said control wheel (5) being mounted on an output shaft (7) and adapted for rotation independently of said output shaft (7), and a pair of planetary gears (8) disposed between said wheels in meshing engagement with said respective bevel gears and rotatably mounted on a shaft (9) integrally connected with and transversely to said output shaft (7), and means subjecting said control wheel (5) to a braking force acting thereon in both directions of rotation.

6. The power control apparatus as defined in claim 5 wherein said means for subjecting said control wheel (5) to said braking force include a peripheral worm gear (11) formed on said control wheel (5) and in meshing engagement with a control worm component (12) fixedly carried on a worm shaft (20), and said worm shaft (20) being subjected to a braking force acting thereon in both directions of its axis, which is transmitted thereby to said control wheel (5).

7. The power control apparatus as defined in claim 6 wherein the means providing the braking force acting on said worm shaft (20) is provided by a coil spring means (13).

8. The power control apparatus as defined in claim 6 wherein said worm shaft (20) is provided with a contact member (29) for actuating a control switch (31) for said driving means when said control wheel (5) is in rotation.

9. Power control means as defined in claim 6 further including means to permit said worm component (12) to be shifted as a control element in opposite axial directions of said worm shaft (20) responsive to a predetermined load on said output shaft exceeding said braking force.

10. Power control apparatus comprising operatively interconnected transversely disposed input and output shafts having complementally intermeshing input worm and output worm gear components for interconnecting said shafts, and further comprising a second set of intermeshing worm and worm gear components of which said second worm gear is mounted on said output shaft and having means operatively interconnecting said respective worm gears; said second worm component being mounted on a control shaft parallel to said input shaft and input worm, means mounting said second worm upon said related shaft component for axial shifting movement as control element responsive to exceeding predetermined output shaft loads, and braking means connected to said control shaft for applying a braking force thereon in both axial directions of shaft movement.

* * * * *